May 20, 1930. E. SMOGROVICS 1,759,633
SHOCK ABSORBING SHACKLED SUSPENSION FOR CAR SPRINGS
Filed Aug. 12, 1927
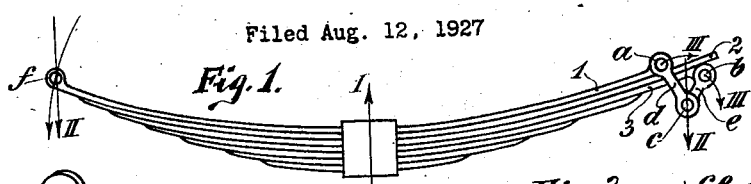
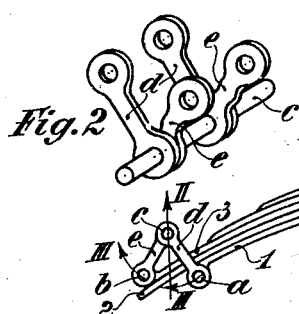
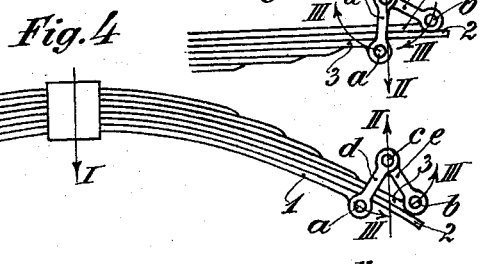
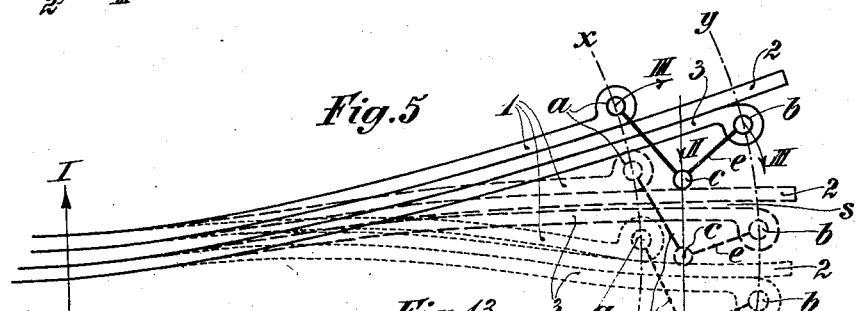
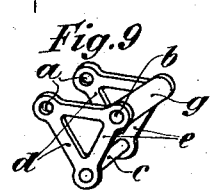
INVENTOR:
Eugen Smogrovics
BY: Ruege, Bayer & Bakeler
ATTORNEYS.

Patented May 20, 1930

1,759,633

UNITED STATES PATENT OFFICE

EUGEN SMOGROVICS, OF PEZINOK, CZECHOSLOVAKIA

SHOCK-ABSORBING SHACKLED SUSPENSION FOR CAR SPRINGS

Application filed August 12, 1927, Serial No. 212,417, and in Germany August 31, 1926.

This invention relates to improvements in shock absorbing shackles for vehicle springs, the object of the invention being to provide a device of this character which will afford entire security against excessive thrust in either direction and will produce a certain bending of the leaves of the spring by means of which said leaves automatically act as buffers for each other, thereby producing a shock absorbing action.

A further object of the invention is to provide a device of the character set forth which is comparatively simple in construction, and in the use of which the liability of breakage of the springs is materially lessened.

With the foregoing and other objects in view, which will appear as the description proceeds, the invention consists in the novel features of construction and combination of parts which will be more fully described hereinafter and particularly pointed out in the claim.

In the drawings accompanying and forming part of this specification,

Fig. 1 is a side view of a semielliptical vehicle spring provided at one end with a shackle constructed in accordance with the present invention;

Fig. 2 is a perspective view of one form of the improved shackle;

Fig. 3 is a side view of one end of a spring illustrating the improved shackle applied thereto in a different manner from that of Fig. 1;

Fig. 4 is a side view of a semielliptical spring in an inverted position and provided with shackles at both ends thereof;

Fig. 5 is a diagrammatic side view illustrating in broken and dotted lines the operation of the spring with the shackle applied thereto as in Fig. 1;

Figs. 6, 7 and 8 illustrate in side view the operation of a shackle mounted in a manner different from that of Fig. 1;

Fig. 9 is a perspective view of a modified form of shackle;

Figs. 10, 11 and 12 are side views illustrating the operation of the shackle shown in Fig. 9;

Fig. 13 is a perspective view of a shackle similar to that of Fig. 9, but adapted to be applied to the spring in the manner shown in Fig. 3; and Figs. 14, 15 and 16 are side views illustrating the operation of the shackle illustrated in Fig. 13.

Referring to the drawings, the three principal leaves of the spring are designated respectively 1, 2 and 3, the leaves 1 and 3 being provided at one or both ends thereof with eyes $a$ and $b$ respectively for pivotal connection with the shackle members hereinafter described. In Fig. 1 the spring is provided with a shackle only at one end, the opposite end being formed with an eye $f$ for anchoring the spring to the body of the vehicle, while in Fig. 4 the spring is illustrated as inverted and provided with shackles at both ends thereof.

In the form shown in Figs. 1 to 5, the shackle comprises a pair of arms $d$ and $e$ respectively, the arm $d$ being pivoted to the eye $a$ of spring leaf 1 while the arm $e$ is pivoted to the eye $b$ of spring leaf 3. The opposite ends of the arms $d$ and $e$ are pivoted upon a common pivot $c$ adapted to be secured upon a fixed portion of the vehicle frame. It is to be noted that in all of the forms illustrated herein, the arms are pivoted to the first and third leaves of the spring, whereby there is always a free leaf between the pivoted leaves. It will be obvious that there may be more than one free leaf between the pivoted leaves, if desired.

The spring shown in Fig. 1 is intended to be supported at its center in the usual manner on the axle of a vehicle, while the spring is pivotally connected to the body frame of the vehicle by means of the eye $f$ at one end of the spring and the pivot pin $c$ passing through the adjacent eyes of the arms $d$ and $e$ pivotally connected to the spring at the opposite end thereof. The operation of the device when so connected is illustrated in Fig. 5. Assuming that the center of the spring sustains an upward thrust as indicated by the arrow I. The pivot pin $c$ being anchored on the frame of the vehicle body, is depressed, as indicated by the arrow II and moves in a vertical line. The pivotal points $a$ and $b$, however, do not follow the vertical movement of $c$ but move in arcs of circles as indicated by the lines $x$—$x$, and $y$—$y$, whereby the positions of points $a$ and $b$ with relation to $c$ are changed, as indicated by the arrows III. By reason of this action, the arm $d$ shifts to a position nearer the vertical and thus raises the point $a$, while the arm $e$ assumes a position nearer the horizontal and thereby moves the point $b$ downward. The effect of this movement is that the spring leaf 3 is separated from the leaf 2 and forms a space $s$ between said leaves 2 and 3. This separation is assisted by the fact that simultaneously with the said movement of points $a$ and $b$, the point $f$ at the opposite end of the spring is also moved in an arc of a circle, as indicated by the arrows at the left of Fig. 1, and since the point $f$ is connected to the body, as is also the point $b$, the latter must follow the movement of point $f$ toward the left, which further accelerates the movement of the arms $d$ and $e$ in the direction of arrows III. Excessive separation of the spring leaves is, however, prevented by reason of the fact that the leaf 1, being considerably shorter than leaf 3, the point $a$ must execute a greater angular movement with relation to the circumferential center of the arcs $x$—$x$ and $y$—$y$ than the point $b$, so that points $a$ and $b$ tend to move toward each other. Theoretically, the separation of the leaf 3 from the leaf 2 continues as long as the points $a$ and $b$ are both moving outward on the arcs $x$—$x$ and $y$—$y$, but when said points arrive at the horizontal line of said arcs and begin to move inward, the movement of the leaves toward each other commences. In other words, when the points $a$ and $b$ pass beyond the turning points of the arcs and the spring begins to curve toward the opposite side, the shackle arms $d$ and $e$ reverse their direction of movement round the point $c$, whereby movement of the point $a$ in vertical direction is accelerated and that of the point $b$ retarded. As this action continues, the leaf 3 contacts with the leaf 2, closes the space $s$ and exerts pressure on the leaf 2, and consequently also on the leaf 1, until finally the pressure of the leaves on each other becomes so strong that further movement in the tensioning direction is stopped and the return of the spring begins. If the shock is a violent one, the end $b$ of the leaf 3 will be bent up a little, as indicated in the dotted position in Fig. 5, but without injury, as at that point the leaf 2 serves as a support therefor. All of the movements of the spring and shackle arms occur gradually and without any sudden shock, because the spring leaves are separated only at the end of the spring, the space $s$ having a maximum width of 2–3 mm. This stopping phase can be predetermined, since it depends upon the upward curvature of the spring and the length of the shackles.

In the form shown in Fig. 4 the spring is illustrated in an inverted position, in which form springs of this kind are usually used transversely of the vehicle. In this form the body of the vehicle is usually secured to the center portion of the spring and exerts pressure downwardly as indicated by the arrow I. Both ends of the spring in this form must necessarily be provided with shackles, and the shackles must be more curved than those used in connection with a side spring, in order that the separating movement may occur in the first stage of the spring action, because in this case the movement of one end does not assist in the separation of the leaves at the other end of the spring as in the case of side springs like that illustrated in Fig. 1. If the structure of the car body should require springs of less curvature, shorter shackles must be employed. In this form the pivot 3 for connecting the shackles to the frame or chassis of the vehicle is disposed outside of the arc formed by the spring and above the latter. As will be obvious, however, the action of the spring under an upward thrust will be the same as that described in connection with Fig. 1. This transverse spring, however, has the additional advantage that in the event of a side thrust on the vehicle body, it is automatically forced to settle itself into its correct position owing to the manner in which the shackles are connected to the ends of the spring.

Fig. 3 illustrates a straight side spring adapted to be supported at its center on the axle of the chassis, as in Fig. 1, but having its pivotal connection $c$ for connecting with the body of the vehicle disposed above the spring. In this form the separation of the leaves 3 and 2 corresponds with the difference in angular movement of the leaves 3 and 1. In other words, the leaf 3 executes a greater angular movement than does the leaf 1, and the difference in these movements controls the extent of separation of the leaf 3 from the leaf 2, while the inward bending of both ends of the spring acts to close said leaves.

In the form shown in Fig. 6, the shackle arms $d$ and $e$ are separately pivoted at $c^1$ and $c^2$ respectively upon the chassis. By reason of the fact, however, that the pivotal points $c^1$ and $c^2$ are disposed respectively above and below the spring, the same effect is obtained as already described in connection with Figs. 1 to 4. In other words, when the pivotal points $c^1$ and $c^2$, which are disposed in fixed relation to each other on the chassis, move downwards under the weight of the vehicle body, the spring leaves tend to straighten, thus moving the pivots of the arms $d$ and $e$ outwards in the direction of the arrows III, whereby the pivots $a$ and $b$ separate one from the other and thus cause a separation of the leaves of the spring as illustrated in Fig. 7. However, when the ends of the leaves have passed below a horizontal line intersecting the arcs described by said ends, the leaves again contact with each other as illustrated in Fig. 8, until finally the pressure becomes so great that further movement of the spring in the same direction is prevented.

All of the foregoing examples illustrate the characteristic that at the center stage of the spring action the leaves of the spring separate. However, this action prevents the disadvantage that the upper leaves at this stage lose part of their support. This disadvantage is entirely overcome by the forms of the device shown in Figs. 9 to 16.

In Fig. 9 is shown in perspective a shackle joint in which the arms *d* and *e* are illustrated as an integral unit. Inasmuch, however, as during the springing action the leaves of the spring glide on each other the shackle can be attached to only one leaf of the spring. In this case, the shackles at opposite sides the spring at *a* and to the vehicle frame at *c*. the rod *b* being provided with a covering tube *g* of leather, rubber or other suitable material, the shackles being pivoted to one leaf of the spring at *a* and to the vehicle frame at *c*. In Figs. 10, 11 and 12, the shackle is connected to the top leaf of the spring and the frame connection is disposed below the spring, while in Figs. 14, 15 and 16 the shackle is connected to the lower leaf 3 of the spring and the frame connection is disposed above the spring. In the device illustrated in these two series of figures, the covered rod *b* lies in contact respectively with the lower and upper leaves of the spring. In both of these series, there is no separation of the leaves of the spring, but instead the rod *b* is moved away from its position adjacent to the spring when the spring is under pressure of a vertical thrust. In the final stage of the spring action, the rod *b* returns into contact with the spring and exerts pressure thereon. The two series of Figs. 10, 11, 12 and 14, 15, 16 illustrate respectively the three phases of operation of the device when the shackles are pivoted to the frame below and above the spring respectively.

Having thus described my invention what I claim is:

A shackle suspension for an upward and downward limitation of the flexing action of vehicle springs, the combination with a semi-elliptical spring, of a shackle joint having three acting points disposed in V-shaped relation to each other, one of said points being disposed in position to exert a downward pressure on the spring at a point within the length of the longest leaf of the spring, another of said points being disposed in position to exert an upward pressure on the spring at the upward and downward stopping stage of the flexing action at a point nearer the end of said longest leaf than the point at which the downward pressure is exerted, the third one of said points being adapted for pivotal connection with a supporting frame, at least one end of a spring leaf being disposed between the downwardly and upwardly acting points of the shackle joint whereby said end is released temporarily at the middle stage of the downward spring action.

In testimony whereof I have signed my name to this specification.

EUGEN SMOGROVICS.